(No Model.)

W. R. PATTERSON.
SCENIC THEATER STAGE.

No. 563,306. Patented July 7, 1896.

Witnesses:
George L. Cragg
W. Clyde Jones

Inventor
William R. Patterson
By Barton & Brown
Attorneys.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

SCENIC-THEATER STAGE.

SPECIFICATION forming part of Letters Patent No. 563,306, dated July 7, 1896.

Application filed May 13, 1895. Serial No. 549,098. (No model.)

*To all whom it may concern:*

Be it known that I, WILLIAM R. PATTERSON, a citizen of the United States, residing at Chicago, in the county of Cook and State of Illinois, have invented a certain new and useful Improvement in Scenic-Theater Stages, (Case No. 102,) of which the following is a full, clear, concise, and exact description, reference being had to the accompanying drawings, forming a part of this specification.

My invention relates to a stage for scenic theaters, and its object is to so arrange the stage and the apparatus thereon that the light effects may be improved, and the scenic apparatus more effectively handled by the operator.

In the stage of my invention the raised objects forming the landscape are placed upon the stage in front of a curtain or wall upon which the light is projected to produce the appearance of clouds, the moon, lightning, rainbows, &c. Above the proscenium-opening, and to the front thereof, is provided an elevated platform, upon which are located the lanterns which project the light effects upon the curtain, also the controlling apparatus, such as motors, rheostats, switches, &c., the operator being also stationed on this raised platform whereby he may control the light effects and be in a position to observe the same as they will appear to the audience. The lamps for producing the effect of the traveling sun are placed just behind the proscenium-opening, but removed from the edges thereof, so as to be invisible to the audience, the mechanism that controls the lamps being provided upon the platform so as to be readily acessible to the operator. Moving parts upon the stage, such as passing trains, are propelled by mechanism controlled likewise from the raised platform.

I will describe my invention by reference to the accompanying drawings, in which—

Figure 1:
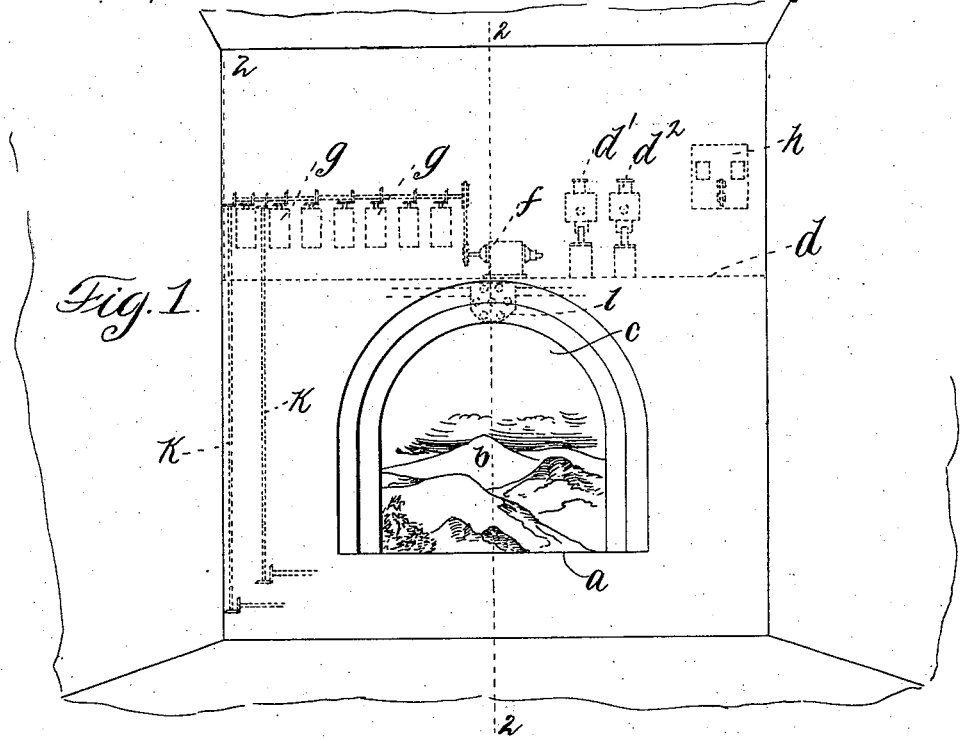
Figure 2:
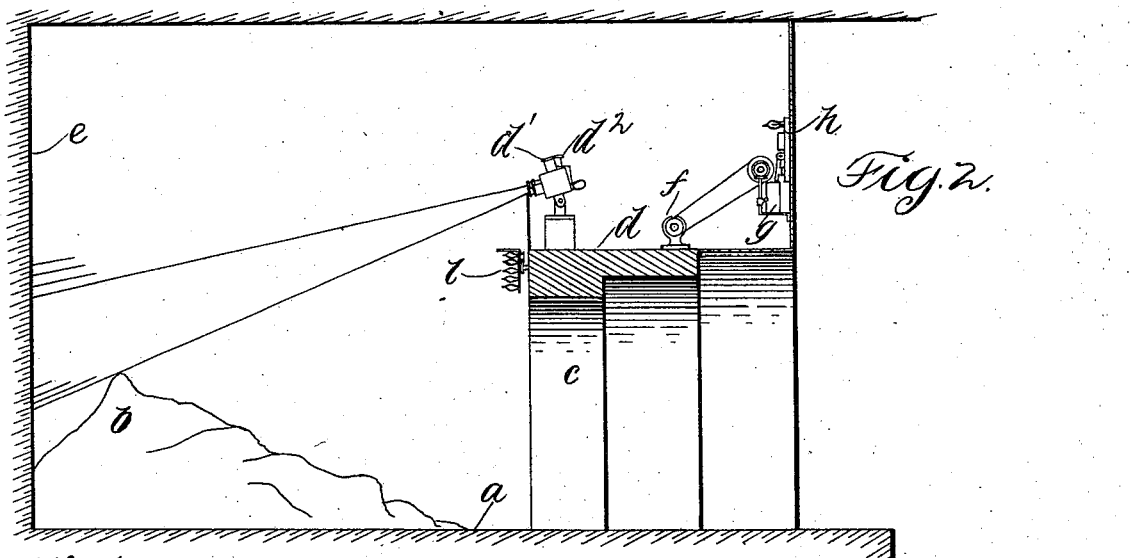

Figure 1 is a view of the stage as it appears to the audience, the raised platform being indicated in dotted lines. Fig. 2 is a sectional view of the stage on line 2 2, Fig. 1.

Like letters refer to like parts throughout the different views.

Upon the stage $a$ are provided the raised objects $b$ of the landscape, the landscape in the present instance being represented as mountainous. Above the proscenium-opening $c$, and to the front of its rear edge, is provided a platform $d$, upon which are provided the lanterns $d'$ $d^2$ for throwing upon the curtain $e$, situated back of the raised objects $b$, the various light effects. Upon the platform is also provided the motor $f$, that drives the mechanism, and the circuit-controlling apparatus, such as rheostats $g$, and switchboard $h$, containing switches, meters, &c. Shafts $k$ extend downward from the raised platform, by means of which power may be transmitted to the various moving devices on the stage, the moving devices being thus under the control of the operator on the raised platform. The lamps $l$, which throw light upon the landscape to represent the sun, are provided just back of the proscenium-opening but removed from the edges thereof, the lamps being controlled from the raised platform.

The raised objects $b$, representing the mountains and hills of the landscape, are removed from the curtain $e$ a short distance to thus leave a space between the mountains and the curtains. The lantern being situated upon a raised platform, light may be projected obliquely downward to a point upon the curtain below the tops of the mountains, the projected light being thus invisible to the audience. As the lantern is rotated, the projected rays may be elevated to cause the light projected upon the curtain to rise above the tops of the mountain, thus appearing to rise from behind the mountains. The projected light when behind the mountains is visible to the operator stationed on the raised platform, though invisible to the audience, so that should any irregularity occur in the light effect it may be observed by the operator and corrected before the same is raised and brought into the view of the audience. I am thus enabled to get better light effects, and place the same more effectively under the control of the operator by stationing both the lanterns and the operator upon a platform situated above and to the front of the rear edge of the proscenium-opening. That is to say, the operator's stage, consisting of a raised platform, is located in a space provided above the proscenium-opening and on the side of the drop-curtain toward the audience. The operator is thus given an unobstructed view of the stage while manipulating his lighting and mechanical apparatus.

Furthermore, by placing all of the controlling apparatus upon the platform where it may be readily handled by the operator, I am enabled to greatly facilitate the control of the scenic effects.

Having thus described my invention, what I claim as new, and desire to secure by Letters Patent, is—

The combination with the platform of a scenic-theater stage having raised objects placed thereon to represent the landscape, of a curtain or wall *e* at the rear of the said raised objects, a raised platform above the proscenium-opening and in front of said curtain or wall and at a distance therefrom to permit rays of light directed from said raised platform to fall upon the curtain or wall behind and below the top of the raised objects, whereby the appearance of a celestial body, as, for example, the moon, may be formed upon the curtain or wall back of the raised objects visible to the operator upon the raised platform but invisible to the audience and then brought into view of the audience as rising from the horizon; substantially as and for the purpose specified.

In witness whereof I hereunto subscribe my name this 27th day of September, A. D. 1894.

WILLIAM R. PATTERSON.

Witnesses:
W. CLYDE JONES,
GEORGE L. CRAGG.